United States Patent
Hirsch et al.

(10) Patent No.: US 9,920,668 B2
(45) Date of Patent: *Mar. 20, 2018

(54) FILTER DEVICE

(71) Applicant: Mahle International GmbH, Stuttgart (DE)

(72) Inventors: Markus Hirsch, Isenbüttel (DE); Marco Stifel, Stuttgart (DE); Zhang Yuan, Shanghai (CN)

(73) Assignee: Mahle International GmbH (DE)

( * ) Notice: Subject to any disclaimer, the term of this patent is extended or adjusted under 35 U.S.C. 154(b) by 98 days.

This patent is subject to a terminal disclaimer.

(21) Appl. No.: 14/940,122

(22) Filed: Nov. 12, 2015

(65) Prior Publication Data

US 2016/0069232 A1    Mar. 10, 2016

Related U.S. Application Data

(63) Continuation of application No. 13/380,206, filed as application No. PCT/EP2010/058618 on Jun. 18, 2010, now Pat. No. 9,212,576.

(30) Foreign Application Priority Data

Jun. 24, 2009  (DE) .......... 10 2009 030 561
Feb. 16, 2010  (DE) .......... 10 2010 008 064

(51) Int. Cl.
*B01D 35/153*   (2006.01)
*F01M 11/03*   (2006.01)
(Continued)

(52) U.S. Cl.
CPC .......... *F01M 11/03* (2013.01); *B01D 27/106* (2013.01); *B01D 35/005* (2013.01);
(Continued)

(58) Field of Classification Search
CPC .... B01D 35/005; B01D 35/16; B01D 35/153; B01D 27/106; B01D 2201/4023; B01D 2201/4076; F01M 11/03; F01M 2001/1064
(Continued)

(56) References Cited

U.S. PATENT DOCUMENTS 6,706,181 B1   3/2004   Baumann et al.
7,507,339 B2   3/2009   Gilles et al.
(Continued)

FOREIGN PATENT DOCUMENTS

DE   3344568 A1   6/1985
DE   29916265 U1   2/2001
(Continued)

OTHER PUBLICATIONS

English abstract for DE-3344568.
(Continued)

*Primary Examiner* — Madeline Gonzalez
(74) *Attorney, Agent, or Firm* — Fishman Stewart PLLC

(57) ABSTRACT

A filter device may include a filter housing cover defining a chamber and an annular filter element arranged within the receiving chamber. The filter device may further include a housing and at least one intermediate piece arranged between the filter housing cover and the housing when the cover is secured to the housing. An inlet duct may be in communication with an untreated side of the filter element and an outlet duct may be in communication with a clean side of the filter element. A drainage duct may be arranged in the housing for draining the chamber during removal of the cover. A closure device may be arrange in the intermediate piece and have a closure element configured to close the drainage duct.

20 Claims, 12 Drawing Sheets

(51) Int. Cl.
  *B01D 35/00* (2006.01)
  *B01D 27/10* (2006.01)
  *F01M 1/10* (2006.01)

(52) U.S. Cl.
  CPC .... *B01D 35/153* (2013.01); *B01D 2201/4023* (2013.01); *B01D 2201/4076* (2013.01); *F01M 2001/1064* (2013.01)

(58) Field of Classification Search
  USPC ........ 210/DIG. 17, 248, 435, 440, 443, 232, 210/249, 428, 429
  See application file for complete search history.

(56) References Cited

U.S. PATENT DOCUMENTS

| | | | | |
|---|---|---|---|---|
| 8,920,650 | B2* | 12/2014 | Stifel | B01D 27/106 210/248 |
| 9,212,576 | B2* | 12/2015 | Hirsch | B01D 27/106 |
| 2008/0179238 | A1* | 7/2008 | Foucault | B01D 27/103 210/348 |
| 2009/0078629 | A1 | 3/2009 | Stemmer et al. | |
| 2011/0036766 | A1 | 2/2011 | Monzie | |
| 2011/0042293 | A1 | 2/2011 | Maier | |
| 2012/0168365 | A1 | 7/2012 | Stifel et al. | |

FOREIGN PATENT DOCUMENTS

| | | |
|---|---|---|
| DE | 19951085 A1 | 4/2001 |
| DE | 102005057710 A1 | 6/2007 |
| DE | 202007002162 U1 | 12/2007 |
| DE | 102007062221 A1 | 6/2009 |
| DE | 202009002455 U1 | 7/2010 |
| EP | 1949950 A1 | 7/2008 |
| JP | 1-132207 | 12/2012 |
| JP | 2012-530872 A | 12/2012 |
| WO | WO-2009083285 A1 | 7/2009 |

OTHER PUBLICATIONS

English abstract for EP-1949950.
English translation of Japanese Office Action for JP2012-516662, dated Oct. 1, 2013.

* cited by examiner

FILTER DEVICE

CROSS-REFERENCE TO RELATED APPLICATIONS

This application is a Continuation of U.S. patent application Ser. No. 13/380,206, filed Mar. 16, 2012, which claims priority to German Patent Application Nos. 10 2009 030 561.0 filed Jun. 24, 2009, and 10 2010 008 064.0 filed Feb. 16, 2010, and International Application No. PCT/EP2010/058618 filed Jun. 18, 2010, all of which are hereby incorporated by reference in their entirety.

TECHNICAL FIELD

The present invention relates to a filter device for fluids, in particular an oil filter for the cleaning of lubricating oil for internal combustion engines of motor vehicles.

BACKGROUND

Filter devices, in particular oil filters for internal combustion engines of motor vehicles usually have a so-called annular filter element, by means of which a fluid flowing through the filter device is filtered. Periodically, this annular filter element must be exchanged in order to be able to always ensure the filtering action of the filter device. By removal of a filter device from the housing, the annular filter element is also removed. Owing to the constantly increasing environmental specifications, the exchange of the annular filter element must be possible here without fluid, in particular oil, arriving into the environment. For this reason, conventional filter devices have in their housing, in addition to an inlet duct which communicates with an untreated side of the annular filter element and an outlet duct which communicates with a clean side of the annular filter element, also a drainage duct, through which a receiving chamber, in which the annular filter element is arranged, can be drained on unscrewing of the filter device. Of course, this drainage duct must be closed off when the filter device is ready for operation, because otherwise the clean side and the untreated side of the annular filter element would be short-circuited with each other and thereby the filter device could not deploy its filtering action.

SUMMARY

The present invention is concerned with the problem of indicating for a filter device an improved or at least a different embodiment which makes possible an automatic opening or respectively closing off of a drainage duct on dismantling or respectively installing a filter device.

This problem is solved according to the invention by the subject matter of the independent claim(s). Advantageous embodiments are the subject matter of the dependent claims.

The invention is based on the general idea of providing an intermediate piece between a filter device, arranged vertically, and a housing arranged therebeneath, into which intermediate piece a closure device is integrated. The closure device is constructed here so as to be rotatable about the filter axis of the annular filter element, wherein the annular filter element itself is arranged in a receiving chamber, which is delimited by a filter housing cover. On the housing side, an inlet duct and an outlet duct are provided, wherein the inlet duct communicates with an untreated side of the annular filter element and the outlet duct communicates with a clean side of the annular filter element. A drainage duct is likewise provided in the housing, through which the receiving chamber can be drained on unscrewing of the filter device, so that no filter fluid, in particular no oil, can arrive into the environment. The closure device, which is arranged so as to be rotatable about the filter axis, has a closure element, by means of which the drainage duct can be closed off when the filter device is screwed fully onto the housing. Generally, the closure device is constructed so that, on screwing on of the filter device on the housing, it is fixed in a precisely defined position in which the closure element is arranged aligned to the drainage duct and is able to be adjusted into a position closing off the drainage duct by the screwing on of the filter device. In contrast to this, the closure device on unscrewing of the filter device from the housing is twisted and is moved at the same time axially away from the housing, so that the closure element on unscrewing of the filter device from the housing frees the drainage duct and makes possible a drainage of the intermediate piece and, if applicable, of the receiving chamber containing the annular filter element. Through the closure device according to the invention, which can be constructed for example as a favourably-priced plastic part with a closure element made of a different plastic, it is possible in the technically simplest manner to reliably close off the drainage duct with the filter device screwed on fully on the housing, and thereby to ensure a problem-free functioning of the filter device, wherein on an unscrewing of the filter device from the housing the drainage duct is automatically opened, so that the receiving chamber containing the annular filter element can drain and no filter fluid arrives into the environment. A separate opening or respectively closing of the drainage duct, connected with the possibility of forgetting this, can be reliably ruled out by the filter device according to the invention, whereby the maintenance process is to be arranged to be distinctly more reliable and in addition easier to arrange. Through the precisely fixed position of the closure device during the screwing-on process of the filter device on the housing, furthermore a laborious positioning or respectively aligning of the closure element with respect to the drainage duct which is to be closed off can be dispensed with, wherein it is always ensured that the drainage duct is reliably closed off with the filter device fully screwed on the housing.

Expediently, the closure device is constructed as a plate and the closure device is constructed as a cap with a plate mounted rotatably therein, and the plate has a perforated lateral edge with openings. When the filter device is screwed on, a compression of the spring element then takes place, whereby an axial displacement of the closure element towards the drainage duct is prevented, so that the closure element rests on an opening of the drainage duct, and namely such that the drainage duct is tightly closed off.

In a further advantageous embodiment of the solution according to the invention, the plate, on screwing on of the filter device with at least one incline, arranged on at least one lateral part of a perforated lateral wall, engages on the projection of the cap and through a further screwing on of the filter device is displaceable into its position closing off the drainage duct.

In a further advantageous embodiment of the solution according to the invention, between the intermediate piece and the annular filter element arranged thereabove, a disc-like base and a simple spring element are provided, wherein the base has several through-openings distributed in circumferential direction. The non-co-rotation of the closure device on unscrewing of the filter housing cover from the housing brings about a lifting of the closure element and hence an axial displacement of the closure device together with the closure element, so that the closure element frees the opening of the drainage duct. The closure device therefore behaves completely differently in the screwing process or respectively unscrewing process of the filter device on/from the housing.

On screwing of the filter device on the housing, the closure device, i.e. the spring arranged between closure device and base, is compressed until the closure element, arranged on the closure device, lies tightly on the drainage duct. Thereby, on screwing of the filter device on the housing, a reliable closing off of the drainage duct can be brought about, and on unscrewing of the filter device from the housing, a reliable opening and hence draining of the receiving chamber can be brought about. This ensures, on the one hand, a high functional reliability of the filter device, and on the other hand an emergence of filter fluid into the environment can be reliably avoided, because the drainage duct is preferably already fully opened with few rotations of the filter device, so that the receiving chamber can drain completely before the filter device is removed through further rotations.

The emergence of fluid into the environment can be additionally prevented by an external axially and radially acting sealing combination, which ensures the closure function of the filter device with respect to the housing even when the flat seal has no contact to the housing.

Further important features and advantages of the invention will emerge from the sub-claims, from the drawings and from the associated description of figures with the aid of the drawings.

It is to be understood that the features mentioned above and to be explained further below are able to be used not only in the respectively indicated combination, but also in other combinations or in isolation, without departing from the scope of the present invention.

Preferred example embodiments of the invention are illustrated in the drawings and are explained in further detail in the following description, wherein identical reference numbers refer to identical or similar or functionally identical components.

BRIEF DESCRIPTION OF THE DRAWINGS

There are shown, respectively diagrammatically.

DETAILED DESCRIPTION

Figure 1:
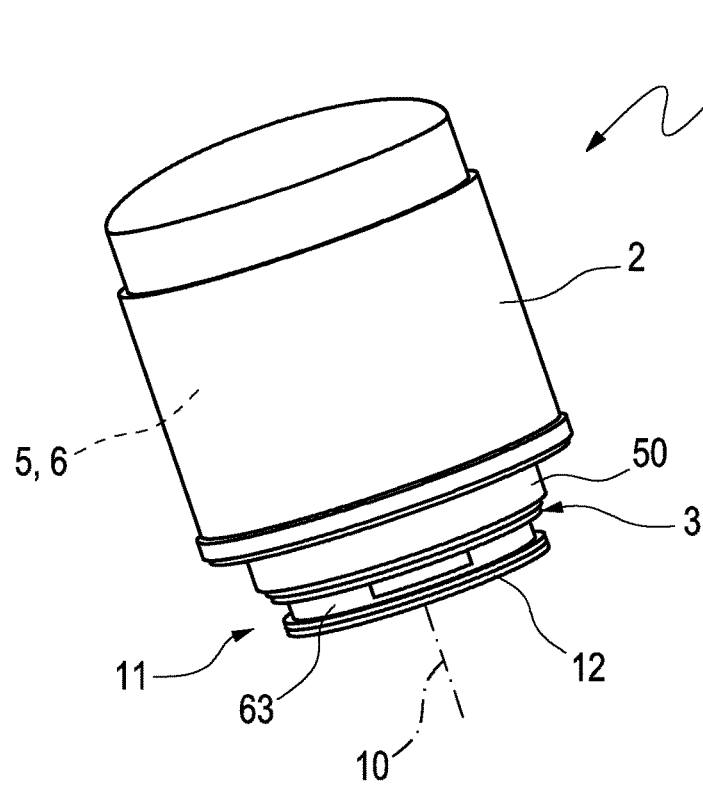
FIG. 1 shows an external view of the filter device according to the invention

In FIG. 1 the filter device 1 can be seen from the exterior. It consists of a filter housing cover 2; the latter forms in its interior a receiving chamber 5 in which the annular filter element 6 is arranged so that it separates a clean side from an untreated side. The internal structure is that of a conventionally used exchangeable filter which is suitable for the filtering of oil. An intermediate piece 3 is situated on the side of the filter device 1 facing the housing 4. The housing 4, on which the filter device 1 is securely screwed, can be, for example, a motor block housing or a cylinder housing. For the sake of simplicity, it is only named as housing 4. The housing 4 is configured so that it has a dome 15 with thread, and the inlet duct 7, the outlet duct 8 and the drainage duct 9 (see FIG. 9).

Figure 2:
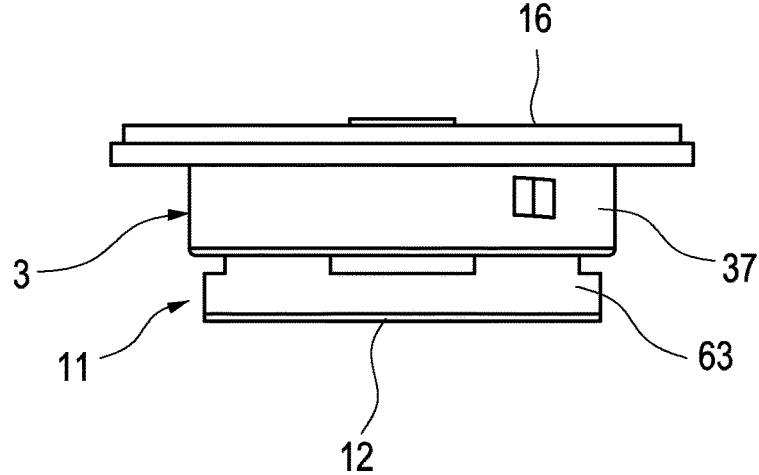
FIG. 2 shows a detail of the external view

In FIG. 2 the intermediate piece 3 is shown, which is tightly flanged with the filter housing cover 2 at the transition of the two parts, and into which intermediate piece 3 a closure device 11 is integrated. The intermediate piece 3 consists of an outer cap 37 and internal plate 63.

Figure 3:
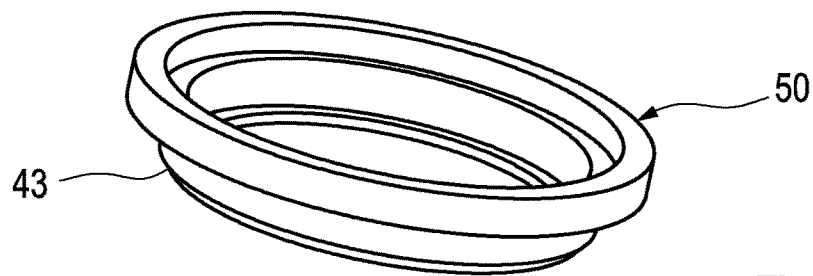
FIG. 3 shows an external seal

In FIG. 3 the seal 50 is shown, lying externally around the cap 37, which seal has in the direction of the housing 4 a lip 43, lying externally against the cap 37, having a radial sealing effect. This seal 50 seals in general the filter device 1 with respect to the environment, so that during the operation of the vehicle and on unscrewing of the filter device, no oil can arrive into the environment. To receive the seal 50, an annular groove 47, open in axial direction, is provided in the cap 37 in the region of the connection between filter housing cover 2 and cap 37 (see FIG. 5).

Figure 4:
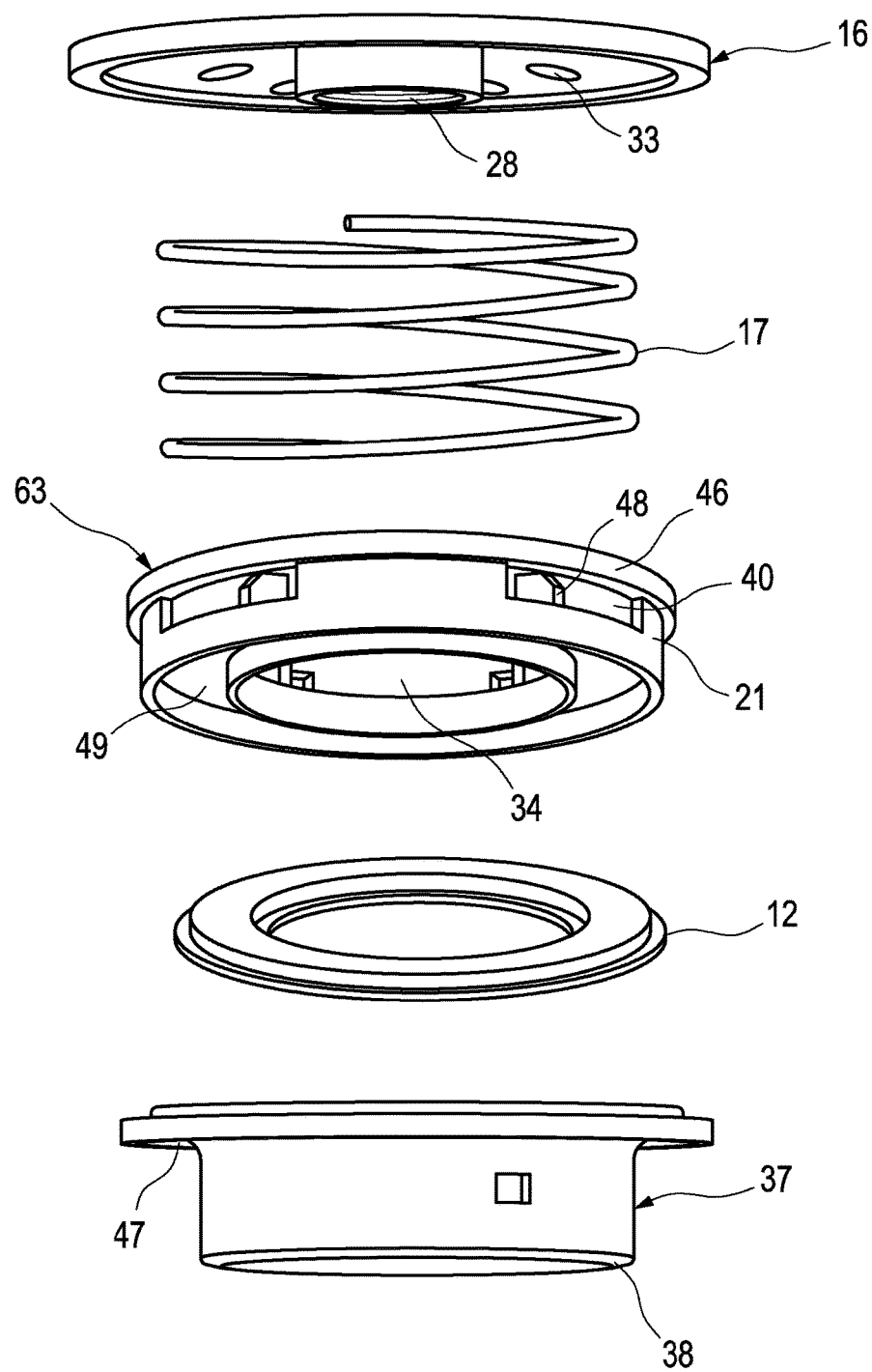
FIG. 4 shows the detail as exploded illustration

In FIG. 4 the individual parts which together form the intermediate piece 3, and further parts are illustrated. A base 16, which has through-openings 33 through which oil can arrive into the receiving chamber 5, forms the closure of the receiving chamber 5. The central opening 34 has a thread or a threaded hollow pin, so that the filter device 1 can be screwed securely on the dome 15 of the housing 4. Between the base 16 and plate 63 there is a spring element 17, a conventional spiral spring in the example which is shown, but any suitable spring element 17 can be used. The spring element 17 has a bearing surface internally on the plate 63. The plate 63 has a central opening 34 and a lateral edge 21, which is perforated by openings 40. The openings 40 are connected at their upper end by a connecting cross-piece 46, which projects slightly in radial direction and thus forms a stop for the plate 63. This stop forms at the same time the mounting of the plate 63 in the cap 37. For this purpose, the cap 37 has an unbent edge 38 at the lower end. The plate 63 also has a flat annular groove 49 on the side facing the housing, into which the closure element 12 is inserted in the form of a flat O-ring seal. The sealing material can also be injected into the annular groove 49. The precise shape of the closure element 12 is dependent on the respective case of application.

All the named parts of the filter device 1, except for the annular filter element 6 and the seals, can be made from metal or else from suitable plastics; in the latter case, however, the cap 37 would not be flanged with the filter housing cover 2, but welded.

Figure 5:
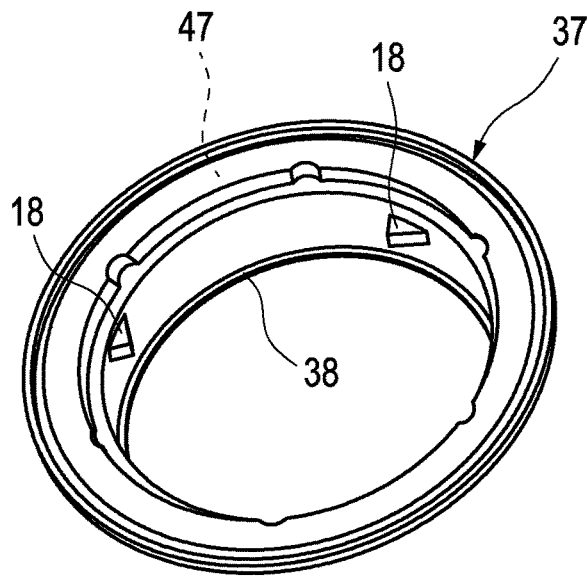
FIG. 5 shows a detail in the top view from above
Figure 6:
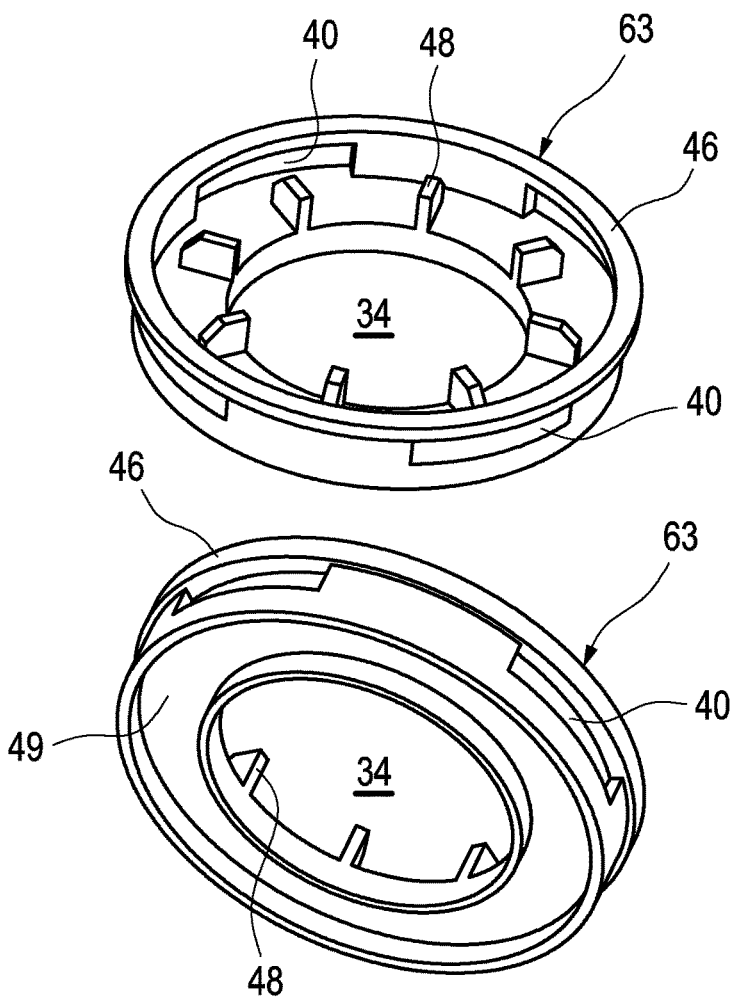
FIG. 6 shows the plate in two views a) and b)

The cap 37 and the plate 63 are illustrated again in detail in FIGS. 5 and 6. At least one projection 18 is situated in the cap 37. The plate 63 is mounted so as to be rotatable as desired in the cap 37. In the plate 63 on the inner side at least one delimiting nub 48 is arranged, which hold the spring element 17 in its place.

Figure 7:
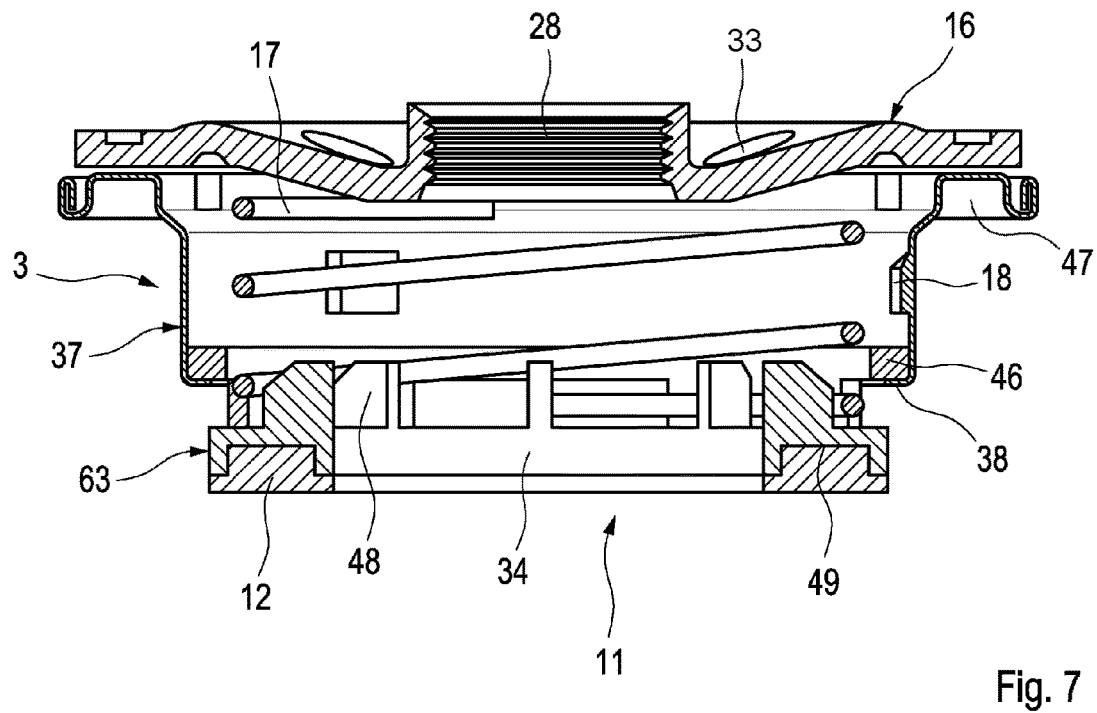
FIG. 7 shows a section through the lower end of the filter device

FIG. 7 shows a section through the lower end of the filter device 1. It can be seen here how it is assembled. In this example embodiment, the projections 18 form an upper stop for the plate 63, so that the plate 63 can not be pressed into the cap 37.

Figure 8:
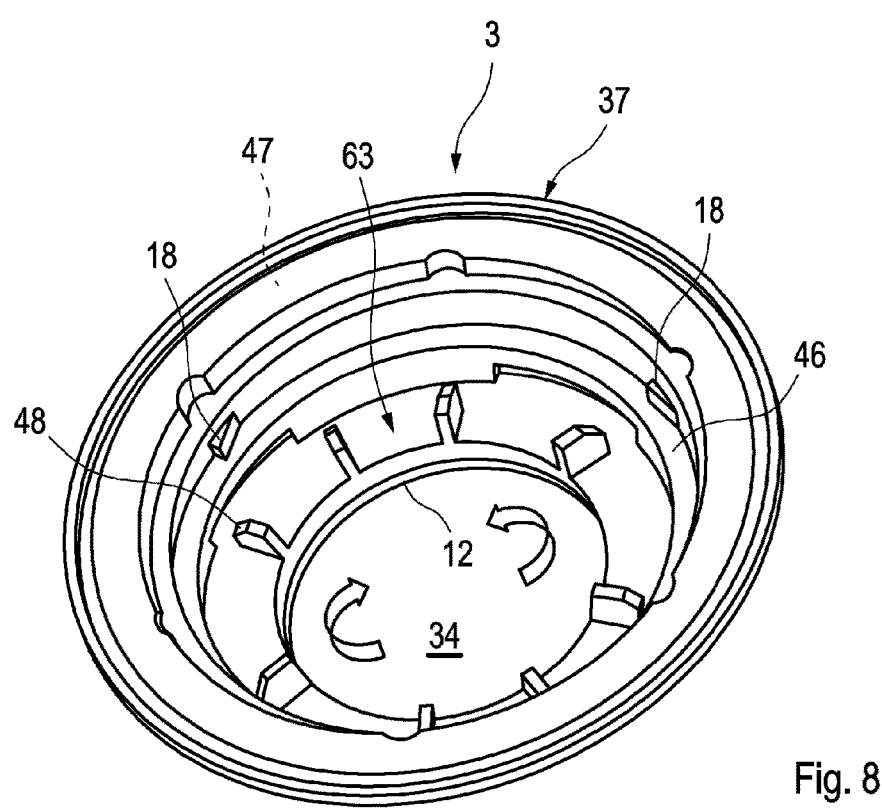
FIG. 8 shows the cap and the plate together

In FIG. 8 an oblique top view is to be seen onto the plate 63, which is mounted rotatably in the cap 37. As the two arrows indicate, the plate is freely movable in both directions of rotation.

Figure 9:
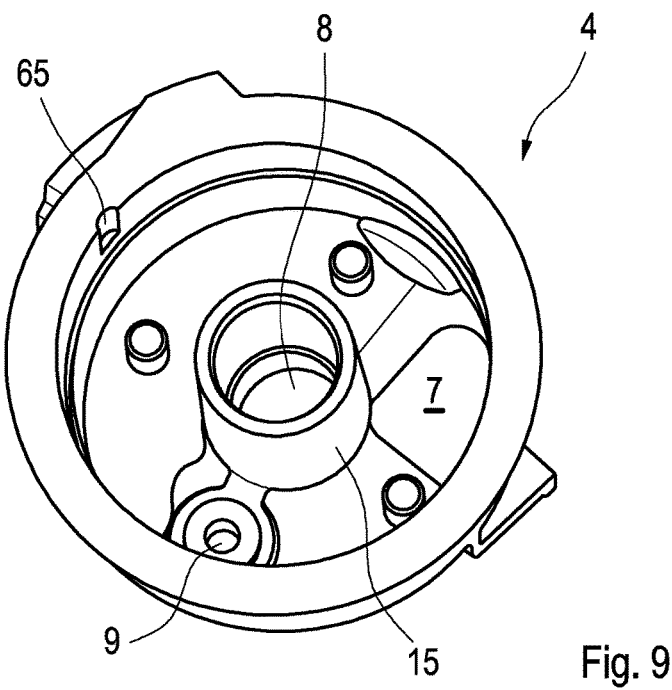
FIG. 9 shows the housing

In FIG. 9 an oblique top view is to be seen onto the housing 4. The inlet duct 7, the outlet duct 8 and the drainage duct 9 can be seen.

In FIG. 9 a ventilation opening is designated by 65, through which, on unscrewing of the cover 2, air can enter from the exterior into the receiving chamber 5, but no oil can emerge.

Figure 10:
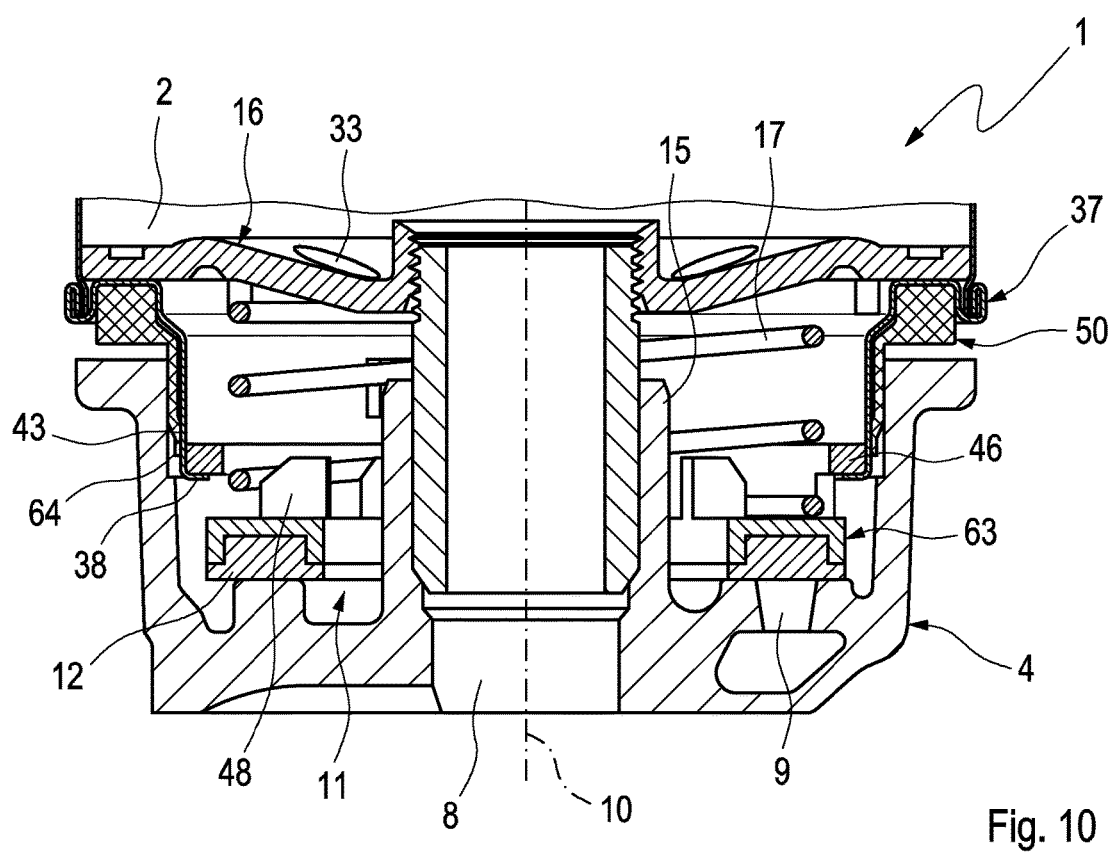
FIG. 10 shows a section through the filter device on screwing on onto the housing

In FIG. 10 the housing 4 is illustrated in section with filter device 1 during screwing on. On screwing on, the plate 63 can be co-rotated, because it is rotatably mounted in the cap 37. However, the plate 63 can also only be moved axially whilst the filter device 1 is screwed on. When the closure element 12 comes to lie on the opening of the drainage duct 9, the plate 63 no longer co-rotates further with the filter device 1. The filter device 1 is further screwed securely until the seal 50 also comes to lie against the housing 4, meanwhile the plate 63 is at rest. In this way, it is avoided that the seal 12 rubs over the opening of the drainage duct 9. The lip 43 which is formed onto the seal 50 now lies against the inner wall of the mounting of the housing 4 and seals the filter device with respect to the environment.

According to FIG. 10, the seal 50 can have an, in particular cylindrical, extension 43 or section 43, which projects axially into an annular space 64 which is produced between the intermediate piece 3 or respectively the cap 37 and the housing 4, when the cover 2 is screwed on, wherein the extension 43, on unscrewing of the cover 2, also still seals radially when the axial seal of the sealing element 50 is eliminated by lifting from the housing 4.

Figure 11:
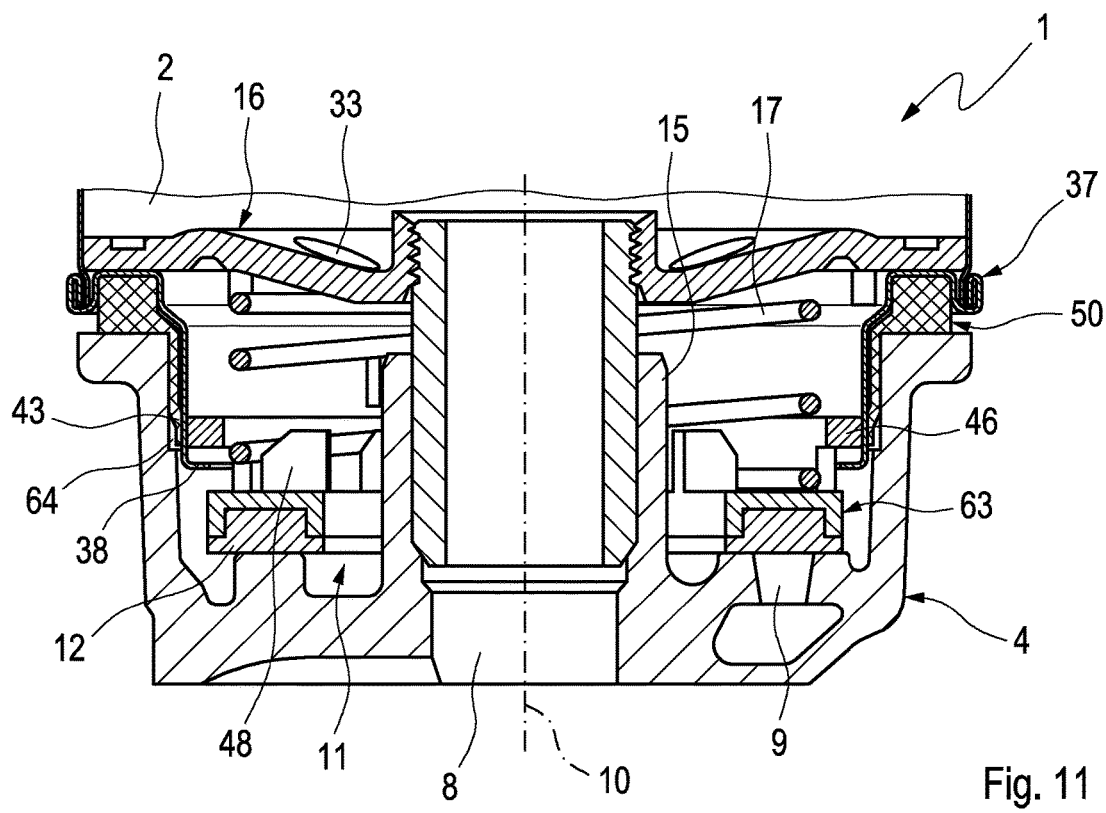
FIG. 11 shows a section through the filter device in the screwed on state
Figure 12:
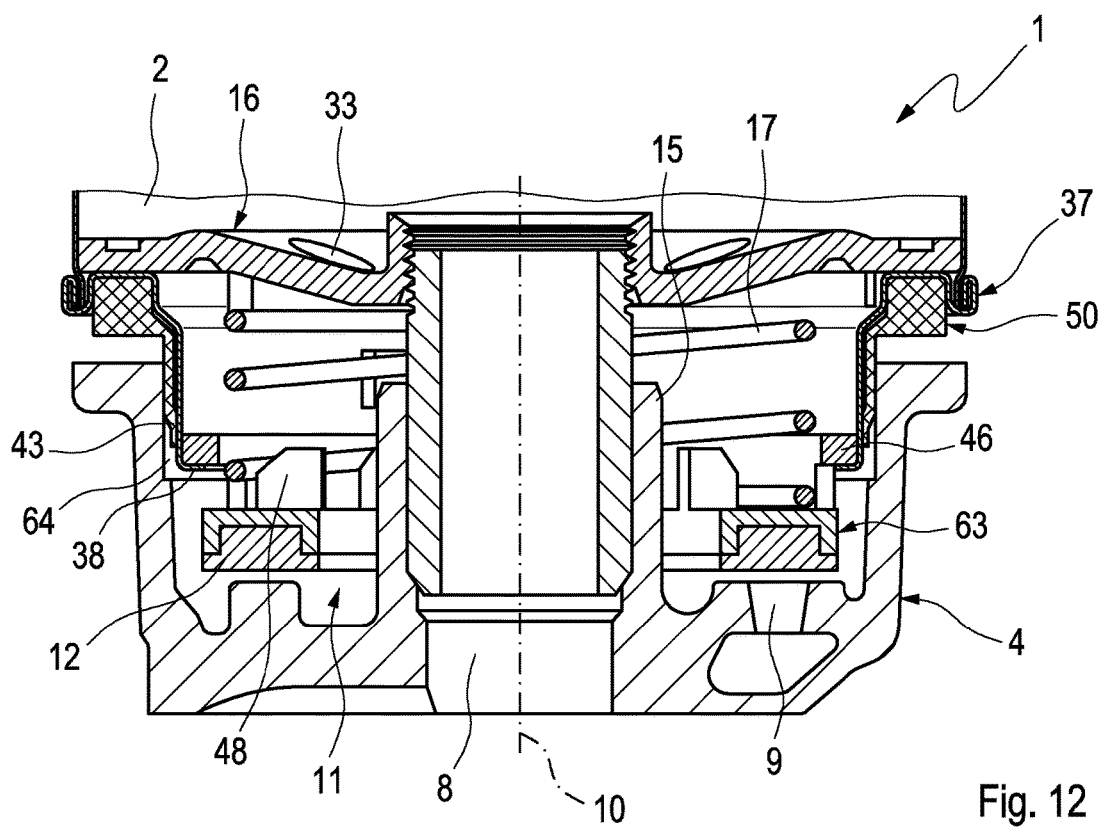
FIG. 12 shows a section through the filter device on unscrewing from the housing

In FIG. 11 the filter device is shown in the screwed on state. By screwing tightly, the connecting cross-piece 46 of the plate 63 is lifted from the bent edge 38 of the cap 37. The spring element 17 presses the closure element 12 onto the opening of the drainage duct 9.

On unscrewing of the filter device 1 from the housing 4, the plate 63 is not moved together with the filter device 1, because it is rotatably mounted in the cap 37. After one to two rotations of the filter device, the edge 38 of the cap 37 takes up the connecting cross-piece 46 of the plate 63 again, so that the drainage opening of the drainage duct 9 is freed, and the oil can flow off out from the receiving chamber 5 of the filter device 1 via the drainage duct 9 before the filter device 1 is unscrewed from the housing.

Figure 13:
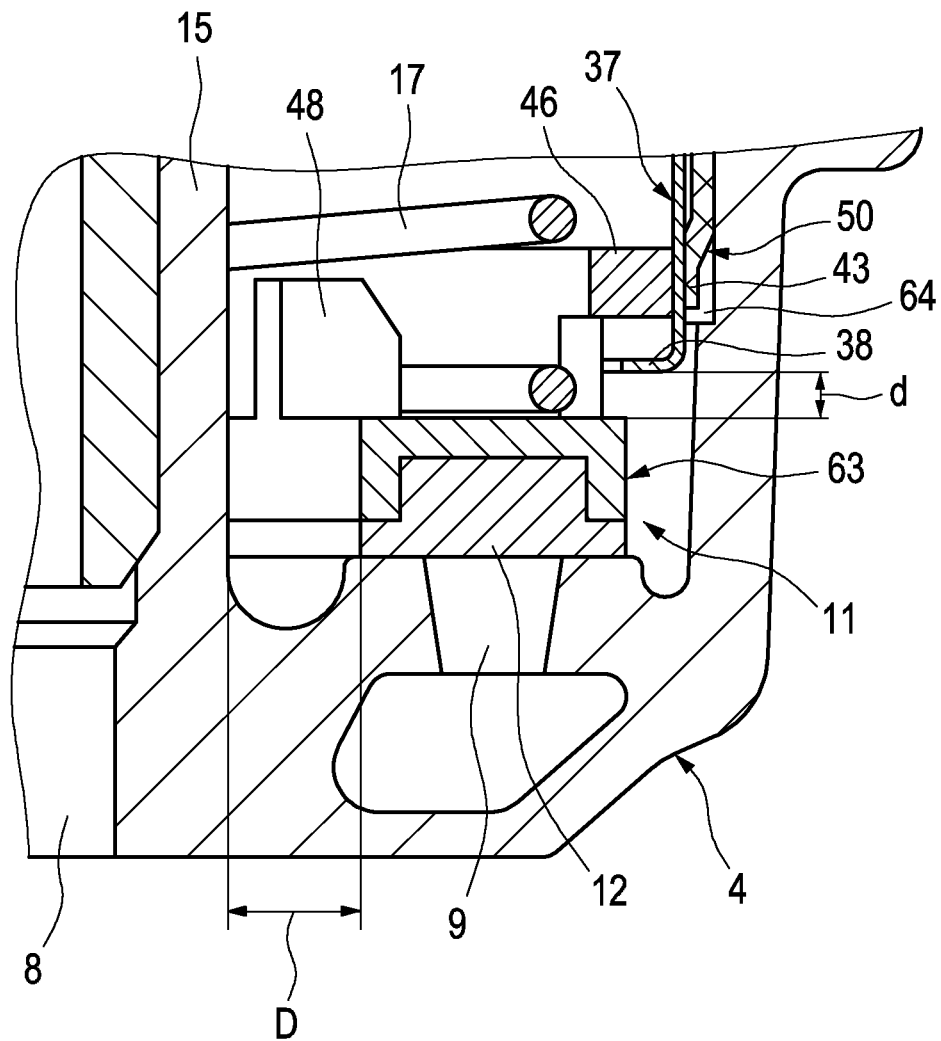
FIG. 13 shows a detail of FIG. 11
Figure 14:
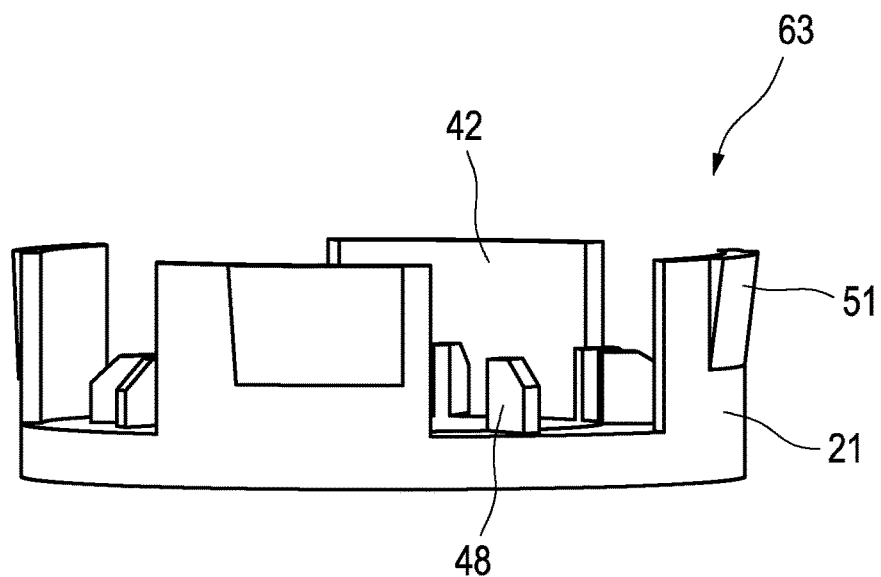
FIG. 14 shows an alternative embodiment
Figure 15:
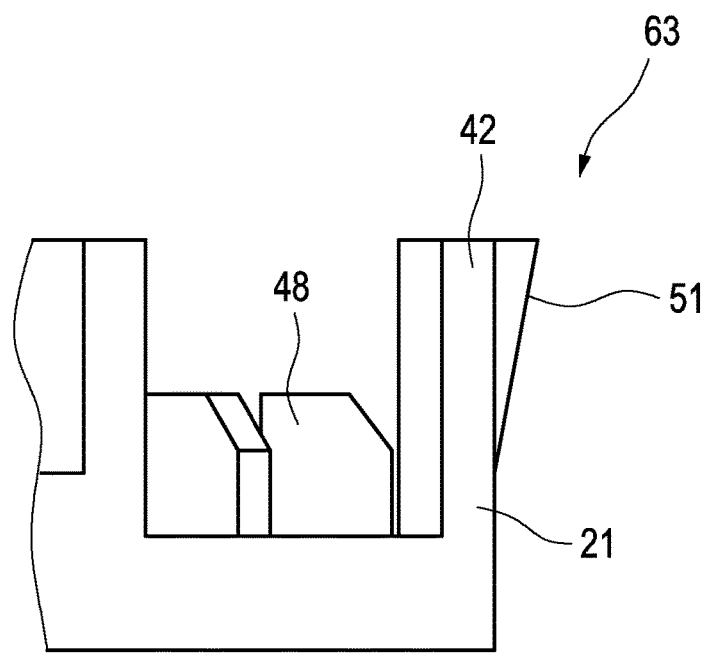
FIG. 15 shows a cut-out of the plate of FIG. 14
Figure 16:
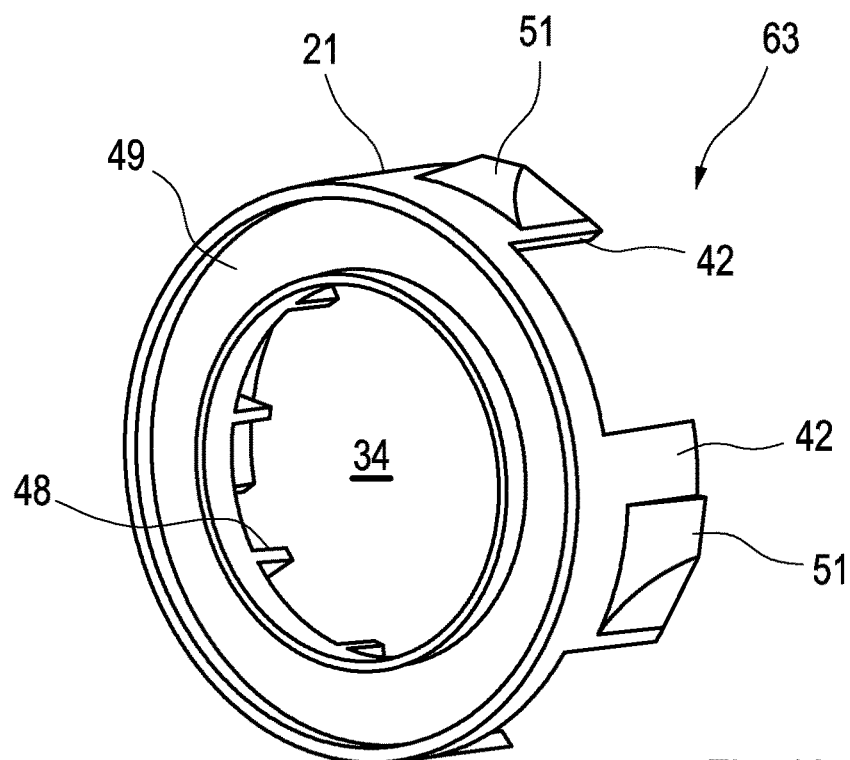
FIG. 16 shows a view of the plate of FIG. 14 from below
Figure 17:
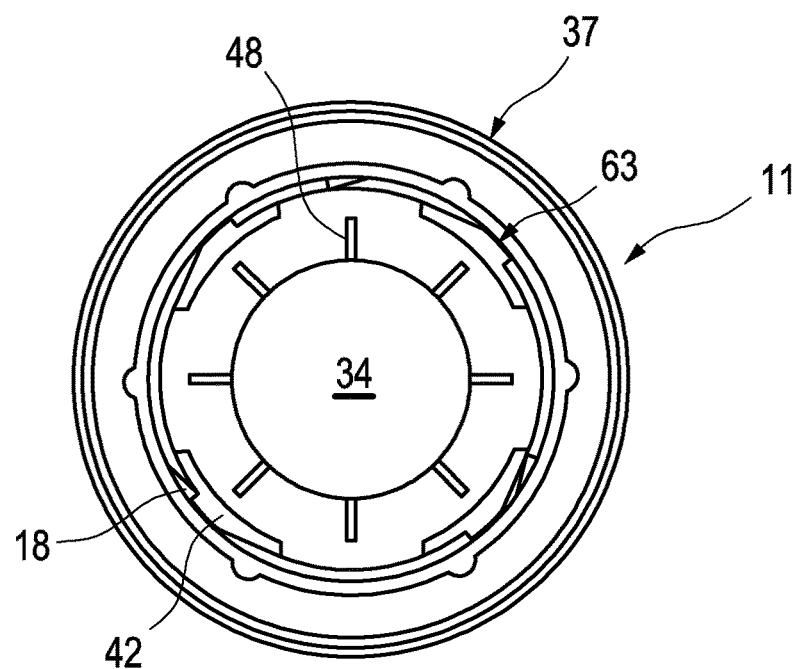
FIG. 17 shows a view of the plate of FIG. 14 with cap
Figure 18:
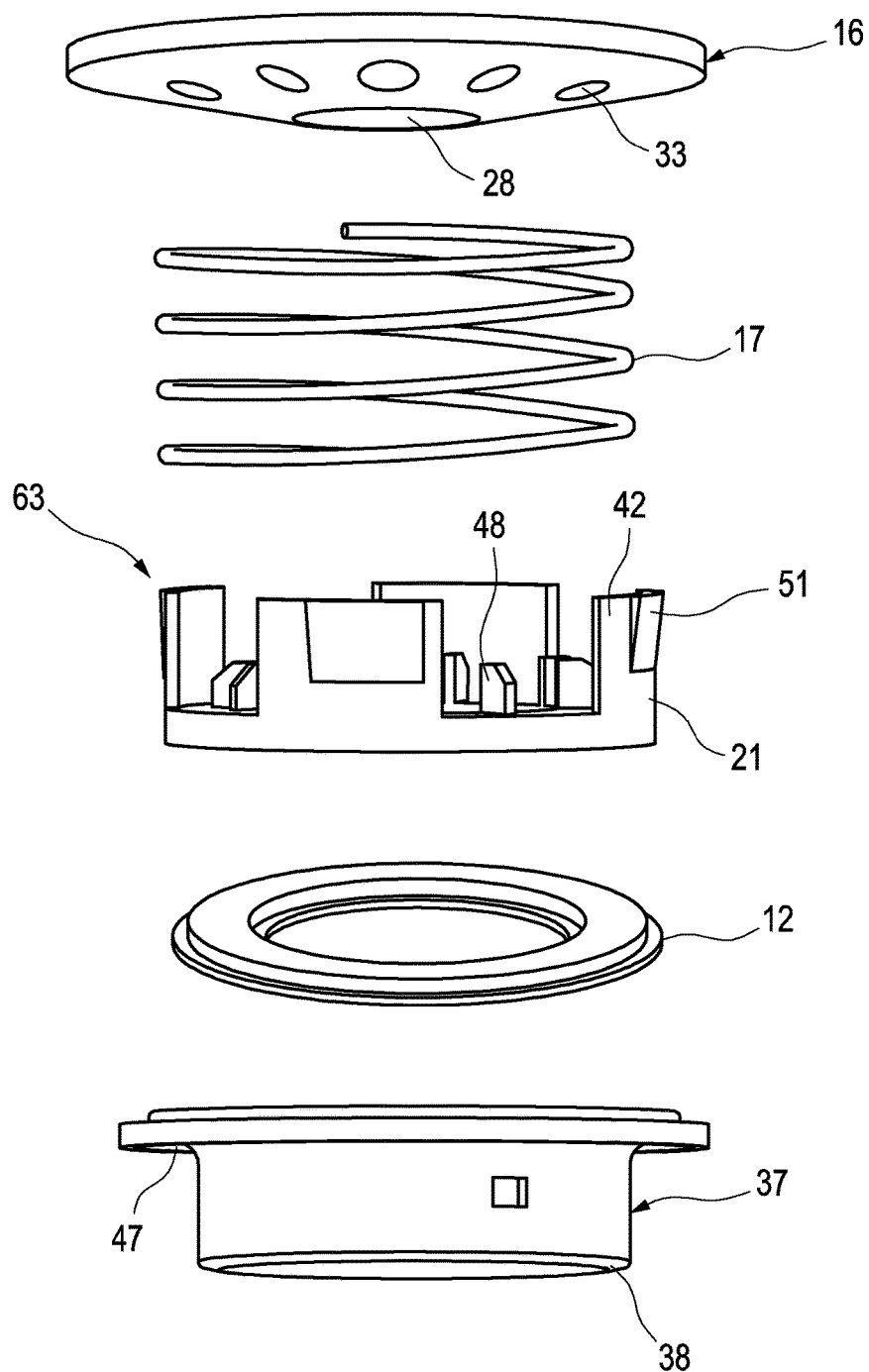
FIG. 18 shows a further alternative embodiment in exploded illustration
Figure 19:
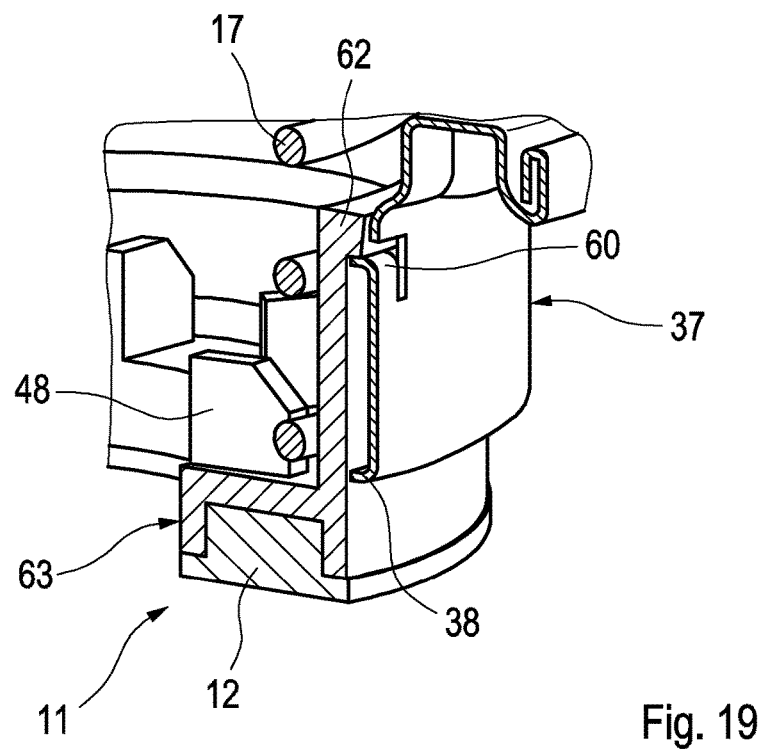
FIG. 19 shows the lower end of the filter device to the further embodiment
Figure 20:
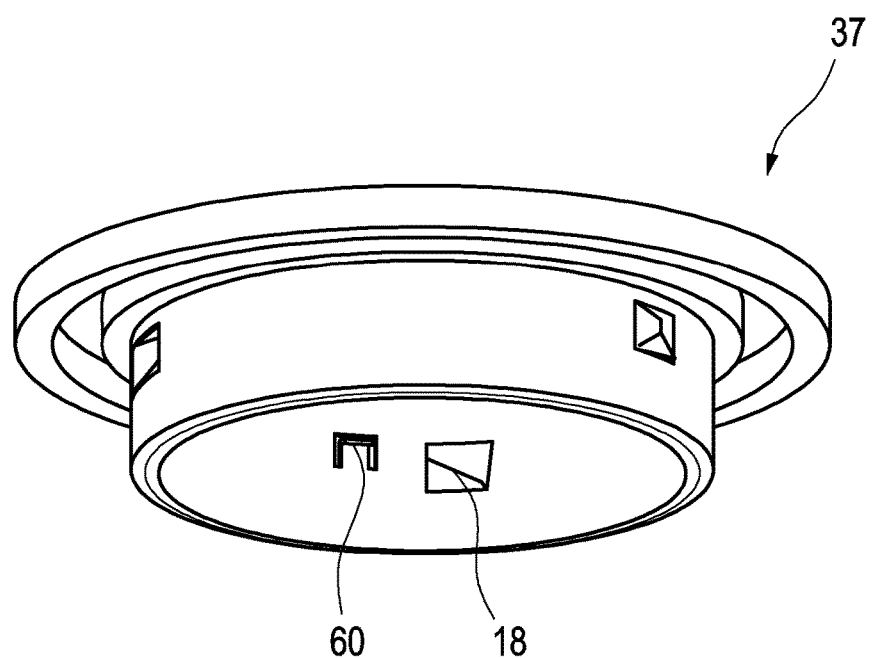
FIG. 20 shows the cap of the further embodiment
Figure 21:
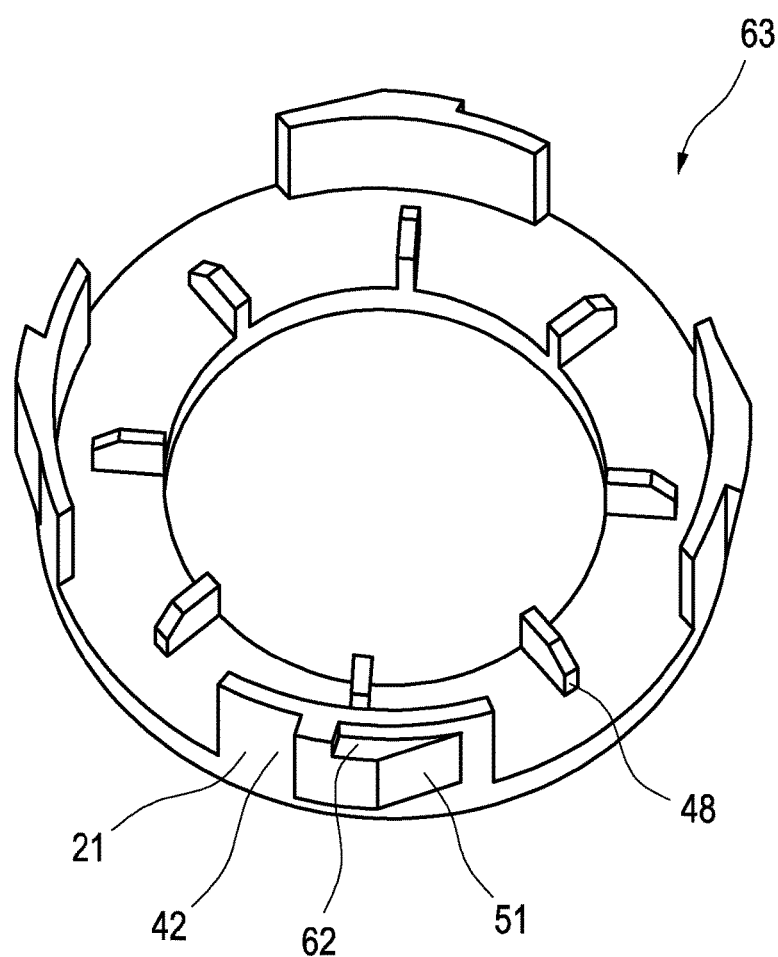
FIG. 21 shows the plate of the further embodiment.

In FIG. 13 a detail of FIG. 11 can be seen, where the filter device 1 is securely screwed on the housing 4. The distances d and D determine the pressure loss of the oil on flowing through the filter device 1 in operation.

In FIGS. 14 to 17 an alternative embodiment can be seen. Here, likewise, the lateral wall 21 of the plate 63 is perforated. An incline 51 is situated on at least one partial piece 42 of the lateral wall 21. On the one side, the incline 51 has a continuously rising surface, on the other side a straight edge which stands perpendicularly on the circumference of the lateral wall 21.

These inclines 51 cooperate with the projections 18 of the cap 37 in a form such that through the edge of the inclines 51 and thereby the entrainment of the closure device 11 on unscrewing of the filter device 1 is guaranteed. Through the incline rise, the elastic force of the spring element 17 is overcome. The closure device 11 is lifted here axially independently of the thread pitch. On unscrewing of the filter device 1, the drainage opening of the drainage duct 9 is freed, so that the oil can flow off out from the receiving chamber 5, before the seal 50 has axially left the contact surface of the housing 4, i.e. distinctly before the filter device 1 is unscrewed fully from the housing 4.

On screwing on of the filter device 1, the plate 63 is contingently mounted rotatably in the cap 37. When the closure element 12 rests on the drainage opening of the drainage duct 9, the plate 63 no longer moves axially and it also no longer co-rotates with the filter device 1.

The filter device 1 is then still screwed securely onto the housing. Thereby, there is no friction of the closure element 12 on the drainage opening. The drainage opening of the drainage duct 9 is tightly closed off through the elastic force of the spring element 17 which presses the closure element 12 onto the housing 4. The edge 38 of the cap 37 lies at a suitable location against the outer circumference of the plate 63, so that the plate 63 does not fall out from the cap 37 on mounting of the filter device 1.

In FIGS. 18 to 21, a further embodiment is illustrated. Here, the lateral parts 42 of the perforated lateral edge 21 of the plate 63 have a projection 62, against which a bent projection 60 of the cap 37 lies and namely such that the plate 63 is not pressed again inadvertently onto the opening of the drainage duct. This bent projection 60 also comes into effect when the plate 63, compared with the cap 37, is rotated, does not move with the filter device, then the projection 62 lies on the bent edge 38 of the cap 37 and in this position prevents the lowering of the plate 63 onto the drainage duct. On unscrewing of the filter housing cover 2, the inclines 51 cooperate again with the projections 18 in the cap 37 and thus overcome the elastic force of the spring element 17, so that the drainage opening of the drainage duct 9 is freed, before the seal 50 has axially left the contact surface of the housing 4 and the filter device 1 is completely unscrewed. The number of projections 60, 62 is able to be selected as desired.

On screwing on of the filter housing cover 2, this embodiment behaves like the other two embodiments.

The invention claimed is:

1. A filter device comprising:
   a filter housing cover defining a receiving chamber, an annular filter element arranged within the receiving chamber;
   a housing defining an axis and a dome arranged centrally in the housing to which the filter housing cover is rotatably secured;
   at least one intermediate piece including a cap arranged between the filter housing cover and the housing when the filter housing cover is secured to the housing;
   a housing-side inlet duct in communication with an untreated side of the annular filter element, and a housing-side outlet duct in communication with a clean side of the annular filter element;
   a housing-side drainage duct arranged in the housing and through which the receiving chamber can be drained during the removal of the filter housing cover;

a closure device including a plate arranged in the cap of the at least one intermediate piece, the closure device further including a closure element configured to close the drainage duct;

wherein the plate of the closure device is structured and arranged to position the closure element in alignment with the drainage duct, and by rotatably securing the filter housing cover on the housing the plate adjusts the closure element into a position closing off the drainage duct, and by rotatably loosening the filter housing cover from the housing the plate of the closure device is moved axially away from the housing so that the closure element opens the drainage duct; and wherein the plate of the closure device includes a lateral side wall and at least one nub disposed radially between the lateral side wall and a central opening of the plate, and wherein the lateral side wall is perforated with openings.

2. The filter device according to claim 1, wherein the the plate of the closure device is moveable with respect to the cap of the at least one intermediate piece.

3. The filter device according to claim 1, further comprising at least one incline arranged on at least one lateral part of the lateral side wall the plate, wherein the at least one incline engages the cap at a projection of the cap and through rotatably securing the filter housing cover on the housing the plate of the closure device is displaceable into the position closing off the drainage duct.

4. The filter device according to claim 1, further comprising an annular base arranged between the at least one intermediate piece and the annular filter element having a plurality of through-openings distributed in a circumferential direction.

5. The filter device according to claim 4, further comprising a spring element arranged between the plate of the closure device and the annular base configured to press the closure element via the plate axially onto the drainage opening.

6. The filter device according to claim 1, wherein the rotatably loosening of the filter housing cover from the housing axially displaces the closure device and opens the drainage duct.

7. The filter device according to claim 1, wherein the closure element includes a body composed of at least one of a plastic and a metal.

8. The filter device according to claim 1, wherein the closure device has an annular groove which is open in an axial direction, and further wherein the closure element is arranged in the annular groove of the closure device.

9. The filter device according to claim 1, wherein the at least one intermediate piece has an annular groove which is open in an axial direction and wherein a sealing element is arranged in the annular groove and is configured to seal the at least one intermediate piece with respect to the housing when the filter housing cover is secured to the housing.

10. The filter device according to claim 9, wherein the sealing element includes a section that projects axially into a radial annular space disposed between the at least one intermediate piece and the housing.

11. The filter device according to claim 1, wherein the cap of the at least one intermediate piece has a surrounding wall enclosing an axially open cavity, and wherein the plate of the closure device is arranged coaxially in the cap.

12. The filter device according to claim 11, wherein the closure device further includes at least one projection disposed at an axial end of the lateral side wall opposite the plate, the at least one projection extending radially from the lateral side wall away from the axis and configured to engage against a bent projection of the cap.

13. The filter device according to claim 1, further comprising an annular base arranged between the at least one intermediate piece and the annular filter element, wherein the annular base includes a plurality of through-openings distributed in a circumferential direction.

14. A filter device, comprising:
a filter housing cover defining a receiving chamber;
an annular filter element arranged within the receiving chamber;
a housing defining an axis and a dome arranged centrally in the housing to which the filter housing cover is rotatably secured;
an intermediate piece arranged between the filter housing cover and the housing when the filter housing cover is secured to the housing, wherein the intermediate piece includes a cap having a surrounding wall enclosing an axially open cavity;
an inlet duct in communication with an untreated side of the annular filter element, and an outlet duct in communication with a clean side of the annular filter element;
a drainage duct arranged at a bottom of the housing and through which the receiving chamber can be drained during the removal of the filter housing cover;
a closure device arranged in the cap of the intermediate piece and rotatable about the axis, wherein the closure device includes a closure element configured to close the drainage duct;
wherein the closure element of the closure device is arranged in axial alignment to the drainage duct and by rotating the filter housing cover in a first direction relative to the housing the closure element is rotated and axially adjustable into a position closing off the drainage duct, and by rotating the filter housing cover in a second direction opposite the first direction relative to the housing the closure element is rotated and axially displaced away from the housing so that the closure element opens the drainage duct; and
wherein the closure device further includes an annular plate and a lateral wall extending axially therefrom and surrounding a central opening, and wherein the closure device has at least one projection disposed at an axial end of the lateral wall opposite the annular plate, the at least one projection extending radially from the lateral wall away from the axis.

15. The filter device according to claim 14, wherein the lateral wall includes at least one radially projecting incline, the at least one incline engaging the cap at projection of the cap and through rotating the filter housing cover in the first direction relative to the housing the closure element of the closure device is axially displaceable into the position closing off the drainage duct, and wherein the at least one projection of the closure device is disposed along the at least one incline.

16. The filter device according to claim 14, further comprising an annular base arranged between the intermediate piece and the annular filter element configured to close the receiving chamber of the filter housing cover, wherein the annular base includes a plurality of through-openings distributed in a circumferential direction.

17. The filter device according to claim 16, further comprising a spring element arranged between the closure device and the annular base configured to press the closure element via the closure device axially against the drainage opening.

18. The filter device according to claim 14, wherein the lateral wall is perforated with a plurality of openings, and wherein the at least one projection is a circumferentially extending cross-piece enclosing at least one of the plurality of openings in the lateral wall.

19. The filter device according to claim 18, wherein the cap includes an edge on an axial end positioned towards the housing, the edge projecting from the surrounding wall into the axially open cavity; and
- wherein the edge of the cap is configured to engage the cross-piece of the closure device to axially adjust the closure device during the rotating of the filter housing cover relative to the housing in at least one of the first direction and the second direction.

20. A filter device comprising:
- a filter housing cover defining a receiving chamber, an annular filter element arranged within the receiving chamber;
- a housing defining an axis and a dome arranged centrally in the housing to which the filter housing cover is rotatably secured;
- at least one intermediate piece including a cap arranged between the filter housing cover and the housing when the filter housing cover is secured to the housing;
- a housing-side inlet duct in communication with an untreated side of the annular filter element, and a housing-side outlet duct in communication with a clean side of the annular filter element;
- a housing-side drainage duct arranged in the housing and through which the receiving chamber can be drained during the removal of the filter housing cover;
- a closure device including a plate arranged in the cap of the at least one intermediate piece, the closure device further including a closure element configured to close the drainage duct;
- wherein the plate of the closure device is structured and arranged to position the closure element in alignment with the drainage duct, and by rotatably securing the filter housing cover on the housing the plate adjusts the closure element into a position closing off the drainage duct, and by rotatably loosening the filter housing cover from the housing the plate of the closure device is moved axially away from the housing so that the closure element opens the drainage duct; and
- wherein the cap of the at least one intermediate piece has a surrounding wall enclosing an axially open cavity, and the plate of the closure device is arranged coaxially in the cap; and
- wherein the closure device further includes a lateral wall extending in a circumferential direction, the lateral wall including at least one radially projecting incline, and wherein the at least one incline engages the cap at a projection of the cap and through rotatably securing the filter housing cover on the housing the closure element of the closure device is axially displaceable into the position closing off the drainage duct.

* * * * *